April 15, 1941.　　　A. W. WOOLLEY　　　2,238,145
TANK TRAP
Filed March 1, 1940
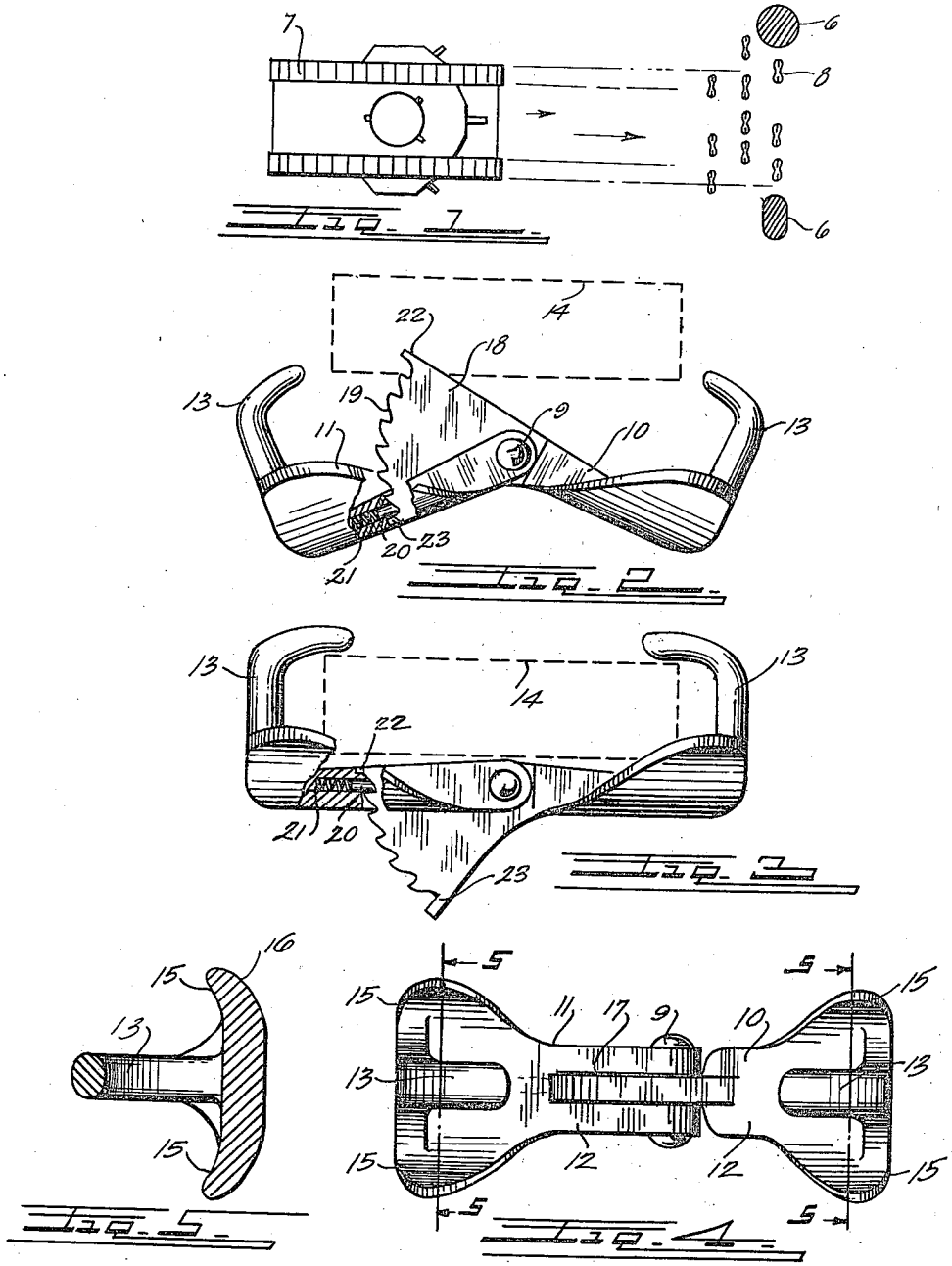
INVENTOR.
ACE W. WOOLLEY
BY
Morton E. Anderson
ATTORNEY.

Patented Apr. 15, 1941

2,238,145

UNITED STATES PATENT OFFICE 2,238,145

TANK TRAP

Ace W. Woolley, Longmont, Colo.

Application March 1, 1940, Serial No. 321,700

4 Claims. (Cl. 89—1)

This invention relates to improvements in means for capturing and rendering inoperative tanks of the type employed in warfare and which will hereinafter be designated as "tank traps."

In modern warfare military tanks are extensively employed as an offensive as well as a defensive weapon. Such tanks are usually provided with caterpillar treads and are heavily armored so as to be quite immune to ordinary rifle fire.

In order to guard, to some extent, against the operation of such tanks, it is customary to provide obstructions that make it necessary for the tanks to travel in restricted paths for the purpose of avoiding such obstructions, and in addition to this such tanks are not suitable for all kinds of terrain and usually follow roadways or paths where the ground is fairly level.

It is the object of this invention to produce a simple and effective device that can be distributed over the ground along places where tanks are most likely to travel and which, when a tank tread passes over them, will close and fasten themselves to the caterpillar tread or to the wheels, or, if pneumatic tires are employed, which will fasten themselves to the tire casings and puncture the same.

The above and any other objects that may become apparent as this description proceeds are attained by means of a construction and an arrangement of parts that will now be described in detail, and for this purpose, reference will be had to the accompanying drawing in which the preferred embodiment of the invention has been illustrated, and in which:

Figure 1 is a plan view showing the manner of positioning the traps in the path of a tank;

Figure 2 is a side elevation of a trap, portions being broken away to better disclose the construction, said trap being shown in open position;

Figure 3 is a side elevation similar to that shown in Figure 2, but shows the trap in closed position;

Figure 4 is a top plan view of the device shown in Figure 3; and

Figure 5 is a section taken on lines 5—5, Figure 4.

In the drawing reference numerals 6 designate obstructions which may be natural elevations of the ground or artificial obstructions built from steel and concrete. Reference numeral 7 designates a military tank traveling in the direction of the arrow, and reference numerals 8 designate tank traps positioned on the ground in the path of the tank.

The construction of the traps has been illustrated in Figures 2, 3, 4 and 5 to which reference will now be had. The traps consist of two jaw members which are hingedly connected by means of a pin 9. One of the jaw members has been designated by reference numeral 10 and the other by a reference numeral 11. Each jaw member consists of a base 12 which is provided at its outer end with an upwardly and inwardly extending projection 13. The projections are curved somewhat as shown in Figures 2 and 3. The rectangle designated by reference numeral 14 represents the caterpillar tread of a tank. It will be observed that each jaw member is provided at its outer end with lateral projections 15 that are substantially flat along the middle of their under surface but which curve upwardly slightly in the manner designated by reference numeral 16. The downwardly convex projections serve to hold the trap with the projections 13 extending upwardly and to prevent it from being readily turned on its side. Jaw member 11 is provided with an elongated slot 17 that extends inwardly from its center point and jaw member 10 is provided with a flattened tongue 18 of a thickness substantially equal to the width of slot 17. The tongue and the inner end of jaw member 11 are provided with openings for the reception of pivot pin 9. It will be observed from Figures 2 and 3 that tongue 18 is somewhat sector shaped and that it is provided along its outer end with ratchet teeth 19 that face upwardly when viewed as in Figures 1 and 2. The bottom of the slot 17 has an opening in which is positioned a steel plunger 20 that is acted upon by a helical compression spring 21 that urges the plunger towards the end of tongue 18 so as to move it into the spaces between the ratchet teeth. The outer and upper corner of the tongue 18 has a projection 22 that limits the downward movement thereof to the position shown in Figure 3 and the outer and lower corner is provided with a similar projection 23 that limits upward movement and the jaw members are therefore movable from the position shown in Figure 2 to the position shown in Figure 3.

When the traps are to be distributed, the jaw members are first positioned as shown in Figure 2 and the traps are then placed upon the surface of the ground in a position in which the length of the jaws extend at right angles to the probable path of the tank. The traps are staggered in the manner indicated in Figure 1 so as to make it probable that a tank will at least pass over one or more of them with its tread in the relation thereto shown in Figure 2. When a tank tread engages the trap in the manner indicated in Figure 2, the weight of the tank will force the parts downwardly into the position shown in Figure 3, whereupon the projections 13 will embrace the tread and lock the trap thereto. If one or more of the tank traps thus becomes attached to a tank tread, the tread is either thrown off from the wheels or becomes broken, or the parts will lock so as to render the tank unmanageable. It is, of course, understood that these traps must be made of high grade steel so as to make breakage very improbable and to give them the necessary strength to resist the heavy strains to which they will be subjected.

If, instead of caterpillar treads, a wheel provided with a pneumatic tire passes over the trap, the ends of projections 13 will penetrate the casing and puncture the same, and if this does not occur, the fact that one or more of these traps attach themselves to the pneumatic casing will render the truck or other vehicle unmanageable and at least temporarily put it out of commission.

Means may be provided for resetting the trap without taking out the pivot pin, such means taking the form of a key, but such means has not been shown because the operation of the device would not be affected thereby.

It will be understood that the device shown on the drawing and described above is intended merely as an example of a device for this purpose and that changes is construction may be made without affecting its mode of operation.

Having described the invention what is claimed as new is:

1. A device for the purpose specified, in combination, two elongated jaws connected for pivotal movement, each jaw having a convex supporting surface and an upwardly and inwardly curved end, and means comprising a pawl and ratchet mechanism for resisting movement of the jaws to open position while permitting them to move to closed position.

2. A device for the purpose specified, in combination, two elongated jaws, means for hingedly interconnecting the same, each jaw being provided at its free end with an upwardly and inwardly curved projection, the jaws having a transversely widened portion adjacent each end, the widened portion being convex on its under side to serve as a base for holding the device with the end projections vertical, and means comprising a pawl and ratchet mechanism for holding the jaws from opening movement while permitting them to move freely towards closing position.

3. A device for the purpose specified, in combination, two elongated jaw members, one of said jaws having a slot extending inwardly from one end and the other having a flat sector shaped tongue for projecting into the slot, said tongue having an opening for the reception of a pivot pin, means comprising a pivot pin for movably connecting the jaws, each jaw member having a widened portion extending in the direction of the pivot which forms a supporting base, the ends of the jaws having upwardly and inwardly extending projections, the end of the tongue being arcuate and concentric with the pivot, the arcuately curved end having ratchet teeth facing upwardly and a spring pressed plunger carried by the other jaw, said plunger engaging the ratchet teeth to prevent the jaw from opening.

4. A device for the purpose specified, in combination, two elongated jaw members each having one end provided with an upwardly extending inwardly curved projection, the other ends of the jaw members having respectively an elongated slot and a flat substantially triangular tongue which is adapted to be positioned in the slot, the plane of the tongue being substantially parallel with the end projection, the slotted end of one jaw member and the tongue having openings for a pivot pin, the end of the tongue being curved about the pivot as a center and provided with ratchet teeth, the other jaw member having a spring pressed plunger for engaging the ratchet teeth, the inclined walls of said teeth slanting downwardly and towards the pivot whereby the jaws can move towards closing position but are held for movement in the opposite direction, the jaws having transversely widened portions forming supporting bases for holding the jaws in upright position.

ACE W. WOOLLEY.